United States Patent [19]

Andersson

[11] 4,378,857
[45] Apr. 5, 1983

[54] MOTOR-CYCLE FRAME

[76] Inventor: Erland Andersson, Hageryd 2923, Kullavik, Sweden, 43041

[21] Appl. No.: 225,664

[22] Filed: Jan. 16, 1981

[51] Int. Cl.³ .................. B62D 61/02; B62K 25/04
[52] U.S. Cl. .................. 180/227; 280/275; 280/283; 280/284
[58] Field of Search ......... 180/227, 219; 280/283, 280/284, 275, 276, 279, 1.182, 1.183, 702, 661

[56] References Cited

U.S. PATENT DOCUMENTS

| 2,863,672 | 12/1958 | Murata | 280/283 |
| 3,301,575 | 1/1967 | Ryan et al. | 280/275 |
| 3,877,539 | 4/1975 | Tilkens | 280/275 |
| 4,162,797 | 7/1979 | McBride | 280/276 |

FOREIGN PATENT DOCUMENTS 125454 1/1900 Fed. Rep. of Germany .
890059 1/1944 France .

*Primary Examiner*—Joseph F. Peters, Jr.
*Assistant Examiner*—Donn McGiehan
*Attorney, Agent, or Firm*—Cantor and Singer

[57] ABSTRACT

The main frame member of a motor-cycle mounts a steering head supporting the front fork, and at its rear end also a rear fork. Both forks are provided with shock absorbers and especially with motor-cycles suited for moto-cross running the movements of the forks in action may be considerable. The combined center of gravity of motorcycle and rider will change due to road and driving conditions, which means that the load upon the shock absorbers will change continuously. Undue compression or expansion of the front fork shock absorbers will alter the inclination of the front fork in relation to the plane of the ground, which makes steering difficult. To counteract such alterations the steering head includes a hoirzontal pivot and lever means connected to the rear fork for adjusting the position of the vertical axis of the steering head by causing a rotation of the head about the horizontal pivot in response to the swinging of the rear fork.

9 Claims, 9 Drawing Figures

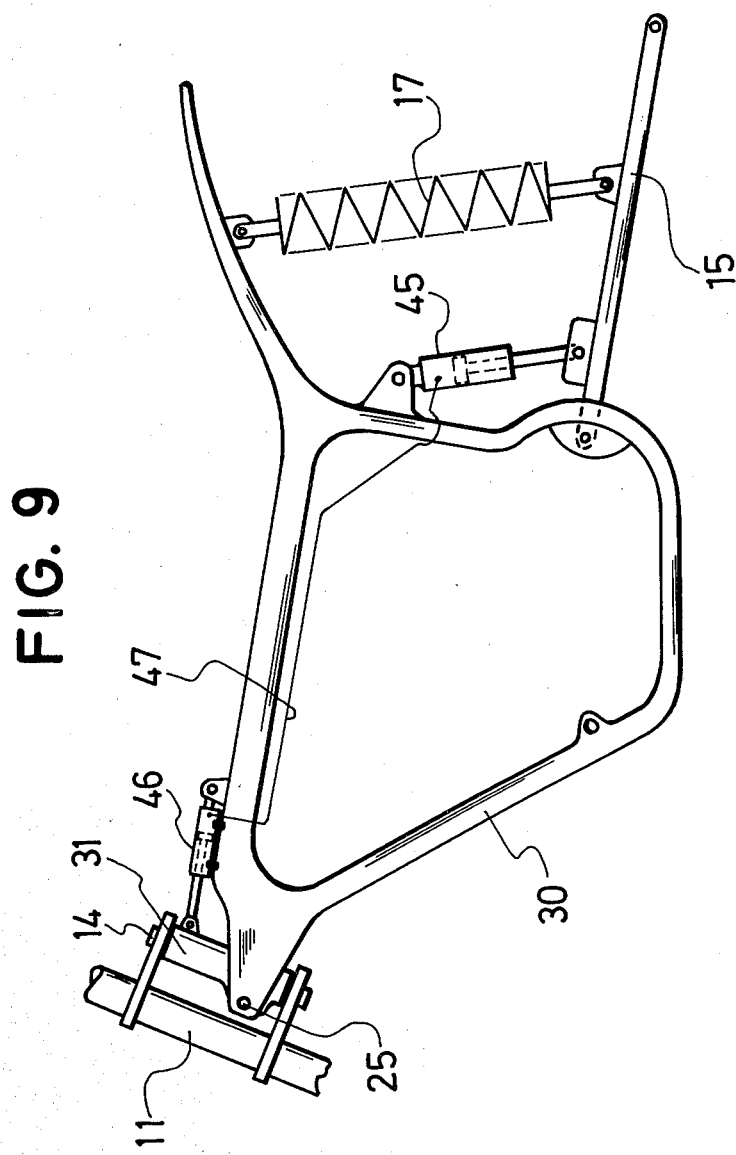

MOTOR-CYCLE FRAME

BACKGROUND OF THE INVENTION

The front and rear forks of a motor-cycle are provided with shock absorbers for dampering forces acting upon the motor-cycle due to its wheels running over obstacles in the road. In a motor-cycle intended for motocross races these shock absorbers permit a considerable movement of the forks, which will make the steering difficult, as the inclination of the vertical axis, about which the steering head rotates, will change, this also altering the distance between the centers of the motor-cycle wheels.

In the specification and claims the expression "vertical axis" is used in order to better define from the horizontal pivot, which is a subject matter of the present invention. It should however be remembered that this axis is not strictly vertical, but that it is slightly inclined towards the horizontal plane and that this angle of inclination, with a conventionally designed motor-cycle, will change due to the varying degree of compression of the shock absorbers during different driving conditions above referred to, causing the difficulties with respect to steering.

SUMMARY OF THE INVENTION

In order to counteract the tendency of varying inclination of the steering head axis it is now proposed that the frame be provided with horizontal pivot means for carrying the steering head, and lever means connecting the rear fork with said horizontal pivot, whereby the inclination of the steering head vertical axis will be altered in response to movements at the rear fork.

The steering head supporting means and the horizontal pivot means are preferably formed as an integral cross-piece.

The lever means may include a fork-shaped member having tines connected to said rear fork and a shaft connected to said horizontal pivot means, said shaft comprising telescopically displaceable members compressible against the action of resilient means.

Alternatively the lever means may comprise a first forked link connected to said horizontal pivot means and second links connecting each of the tine members of said rear fork with said first link. The first forked link may comprise means for attachment to said steering head mounting means, a first of said attachment means being located above said horizontal pivot means and behind said vertical pivot axis, and a second of said attachment means being located below said horizontal pivot means and in front of said vertical pivot axis.

In order to vary the distance between the rear end of said first forked link and said rear fork the connection between said first forked link and said second link may comprise excenter means.

The transfer means may include fluid pressure actuating means mounted between the main frame member and the rear fork, and pressure fluid actuated means mounted between the main frame and the cross-piece. The pressure fluid actuated means may be connected directly to said cross-piece, or to a lever extending rearwardly from the cross-piece.

BRIEF DESCRIPTION OF THE DRAWINGS

FIGS. 8 and 9 show motor-cycle frames according to the invention, where power transfer means include pressure fluid operated devices.

DESCRIPTION OF SOME PREFERRED EMBODIMENTS

Figure 1:
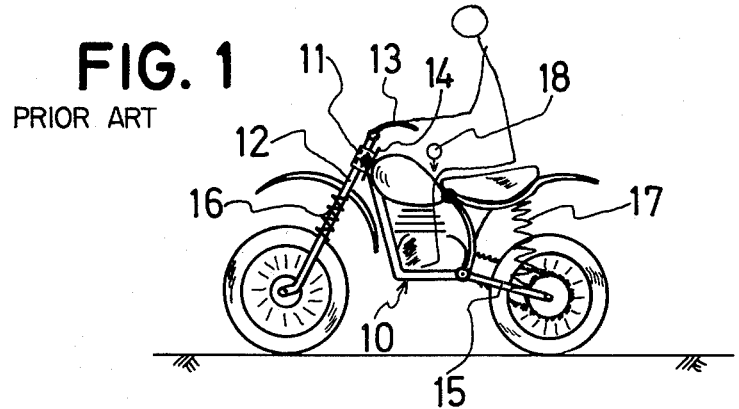
FIGS. 1–3 show a motor-cycle during various load conditions.

FIG. 1 shows schematically a conventional motor-cycle used for motocross races, the situation representing conditions when running over level ground.

The components of a motor-cycle are supposedly well known to anyone familiar with this type of vehicle, and reference will here be made only to components having a direct bearing upon the invention.

The motor-cycle thus has a main frame member 10, which at its front end carries a steering head 11 mounting a front fork 12 connected to handle bars 13. By means of those the front fork may be turned in relation to a pivot axis 14, which for reasons explained above will be referred to as being "vertical", although it in reality is slightly inclined in relation to ground level.

At its rear end the main frame member 10 carries a rear fork 15.

The front fork 12 is provided with shock absorbers, i.e. spring means 16, and at rear fork 15 there are further shock absorbers 17 or spring means. The shocks to be taken care of by these absorbers may be considerable and their respective strokes will noticeably influence the position of the rider and of the steering head. For purpose of reference the center of gravity of motor-cycle and rider is denoted by 18 resulting in an even load upon the shock absorbers.

Figure 2:
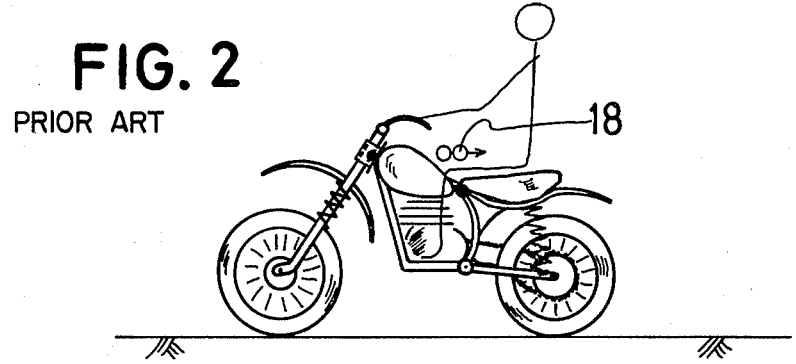

FIG. 2 intends to simulate the condition during a sudden acceleration. During an acceleration the center of gravity 18 will be "left behind" the weight of the rider shifting backwards causing an increased compression on the rear shock absorbers 17, while decreasing the load upon the front shock absorbers 16. The resulting action on the frame will be a raising of its front portion and the shock absorbers 16 will push the front wheel outwards, increasing the inclination of pivot axis 14.

Similar load conditions and alterations in the relative positions of the components will occur when running uphill a steep incline.

Figure 3:
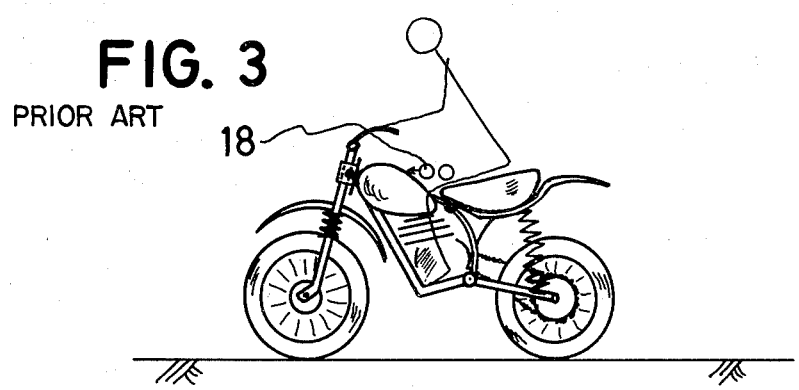

FIG. 3 intends to show the conditions when the motor-cycle is suddenly braked either by the driver, or by the front wheel hitting a severe obstacle. The weight of the rider is shifted forwards, which means an increased load upon the front fork shock absorbers 16, while simultaneously the rear shock absorbers are relieved. This will reduce the angle of the steering head axis in relation to the ground. Similar conditions will occur when running downhill a steep incline.

The three figures show that the angle of inclination of the front fork system will continuously vary due to occasional driving conditions, and also that the distance between the centers of the wheels will vary. This makes the steering more difficult and increases the work to be performed by the rider.

In order to reduce the drawbacks above referred to the invention proposes the use of a horizontal pivot for mounting the steering head 11 and also lever means connecting the pivot with the rear fork.

Figure 4:
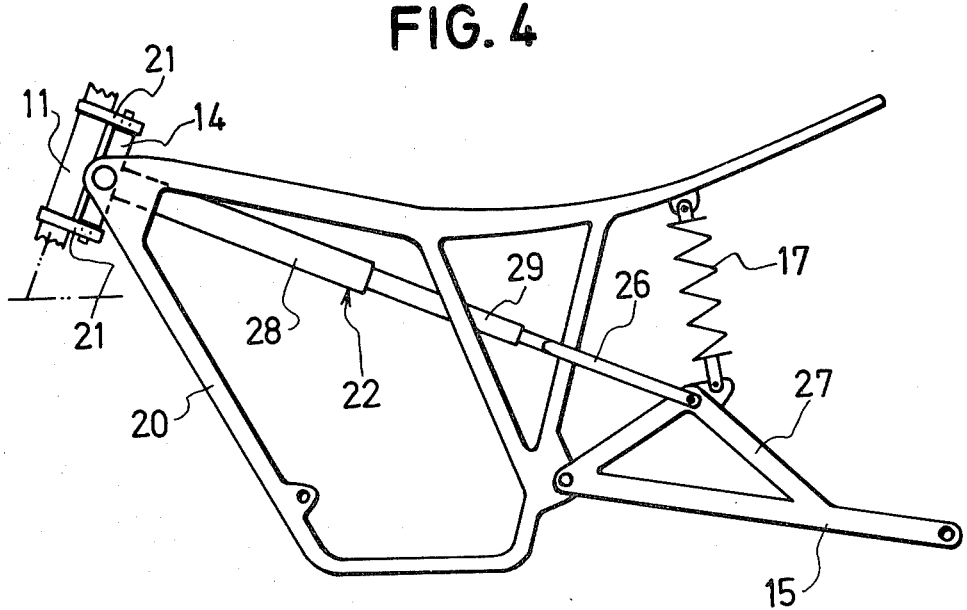
FIG. 4 shows a first embodiment of a frame with lever means connecting the steering head and the rear fork.
Figure 5:
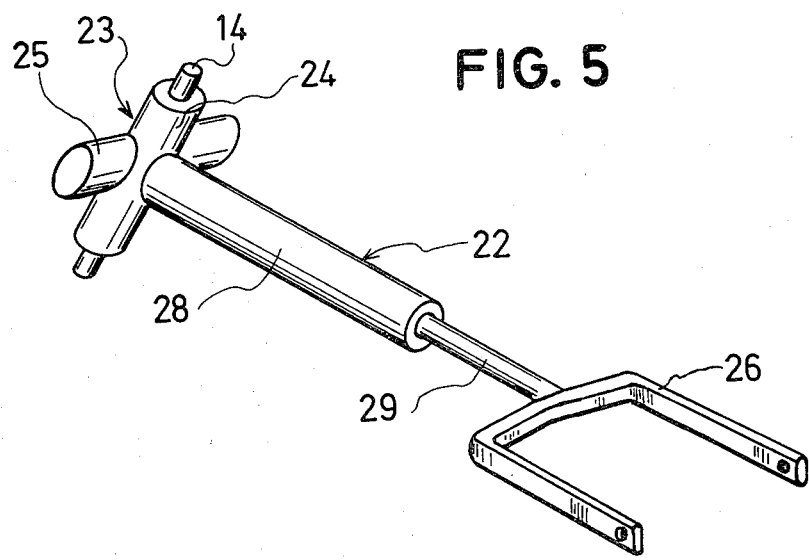
FIG. 5 shows a schematic, perspective view of the lever means included in FIG. 4.

FIGS. 4 and 5 show a first embodiment of the invention. The main frame member 20 carries the steering head 11, which in a conventional manner includes two brackets 21 ridigly attached to the parallel rods 12 of the front fork and being pivotable about the vertical pivot axis 14, which normally is integral with the main frame member. The rear fork 15 is, as usual, swingably supported at the rear end of the frame. The rear shock absorbers 17 are shown in this figure, but their size may be reduced due to the special design of the lever means 22, connecting the rear fork with a cross-head 23 formed by the member 24 supporting the vertical pivot axis 14 and a horizontal pivot 25, which is to be journalled at the front end of the frame.

FIG. 5 will clearly show that a swinging movement of the lever means 22 about pivot 25 will vary the inclination of the steering head axis 14.

The lever means 22 includes a rear, forked portion 26, the tines of which are connected to brackets 27 at the rear fork 15. The shaft of the lever means comprises two telescopically cooperating parts 28 and 29, of which the former is desinged as a cylinder, enclosing spring means and/or hydraulic or pneumatic shock absorber means of designs well known in the art.

As explained in connection with FIGS. 2 and 3 the rear fork 15 will perform swinging movements due to varying driving conditions. These movements will be transferred to cross-piece 23 by the lever means. The resiliency of the shaft of the lever means will modify the movement and to some degree act as rear shock absorbers.

Figure 6:
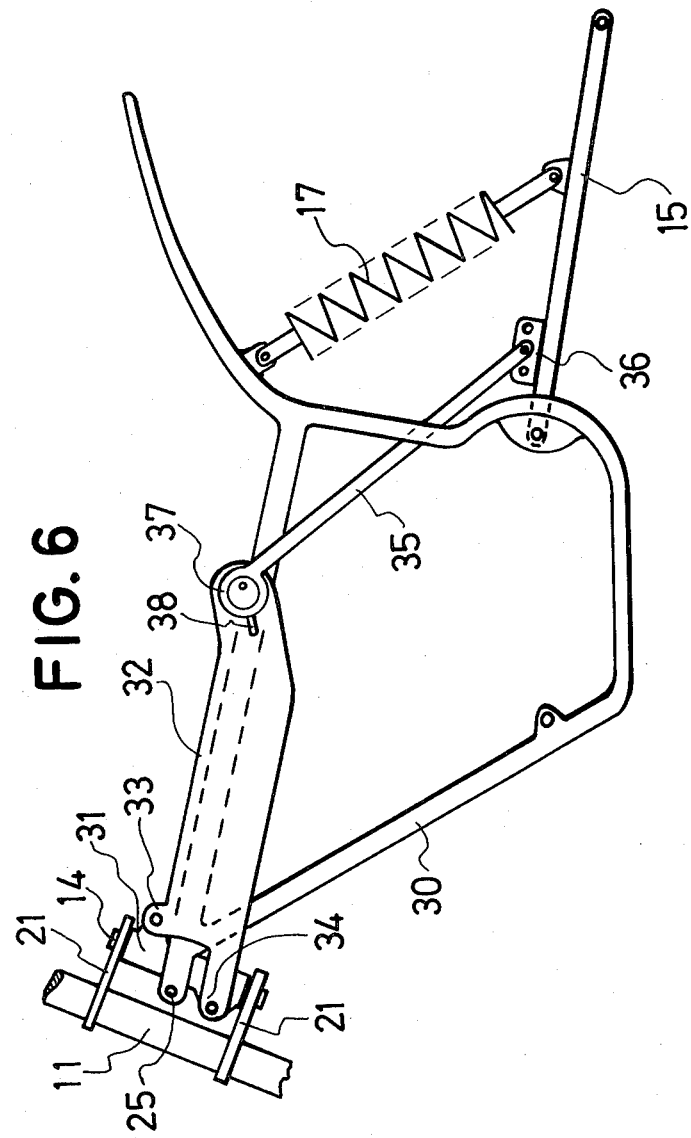
FIG. 6 shows a second embodiment of a frame with a different type of lever means.
Figure 7:
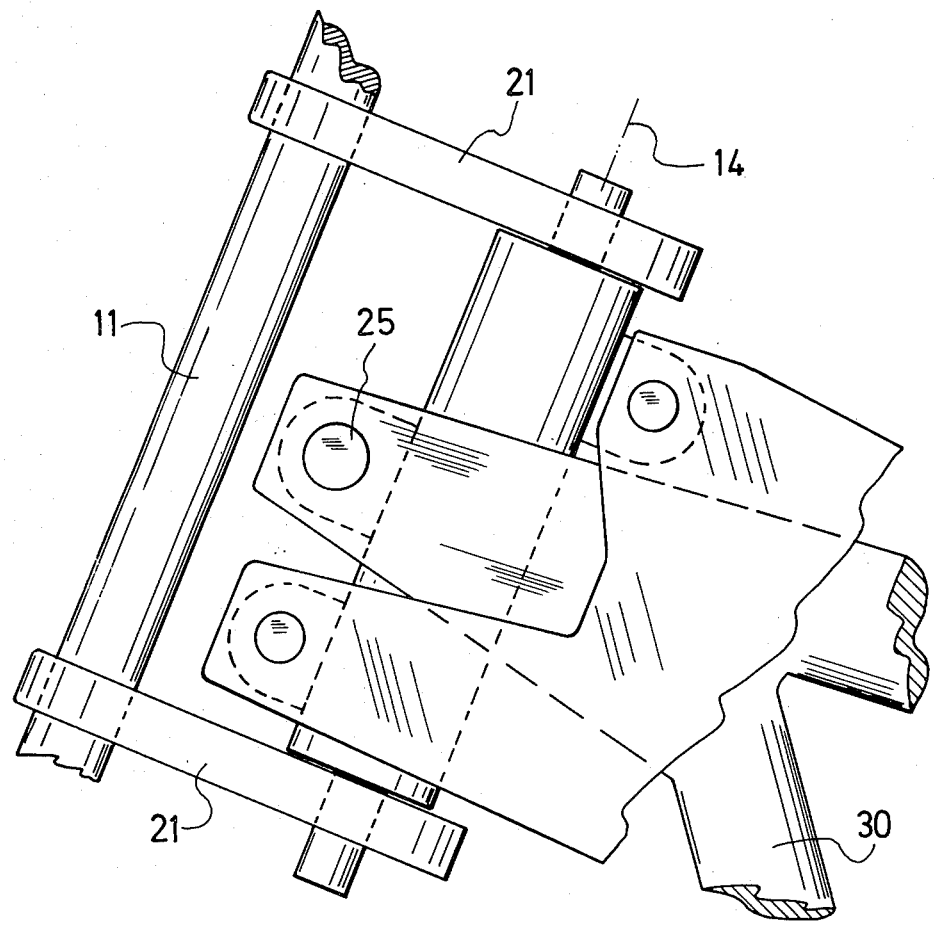
FIG. 7 shows the steering head of FIG. 6 and the front end of the lever means connected thereto.

FIGS. 6 and 7 illustrate a further embodiment of the invention.

The frame member is denoted by 30 and a cross-piece carrying the vertical pivot axis 14 and the horizontal pivot 25 is denoted by 31. The components of the front fork carry the same reference numerals as in FIG. 4.

The lever means here includes a first channelshaped link 32, which straddles the top link of the frame 30, and at its forked front end is provided with two pairs of ears 33 and 34, respectively. These are connected to the cross-piece 31 in such a manner that ears 33 will be attached above the horizontal pivot 25 and behind the vertical pivot axis 14, while ears 34 will be attached in front of the vertical axis 11 and below the pivot 25. This will provide a good grip upon the cross-piece and make it easy to transfer movements of the lever means to the cross-piece.

Two parallel rods 35 connect the rear fork 15 with the lever link 32. The rear ends of these rods are attachable to racks 36 at the rear fork, to make possible an adjustment of the length of the lever means. A final adjustment is obtainable by the upper ends of the rods 35 being mounted upon lever link 32 by means of excenters 37, the disk of which is rotatable by means of a handle 38.

Figure 8:
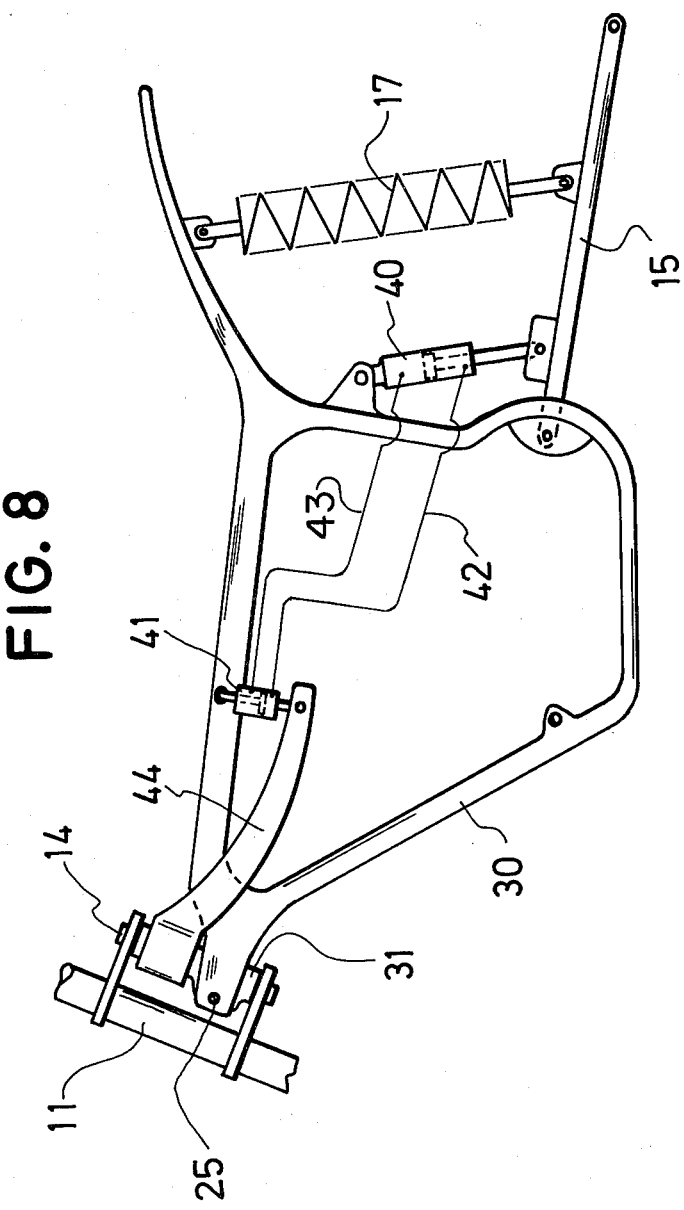

FIG. 8 shows a further modification, where the power transfer between the rear fork 15 and the cross piece 31 includes pressure fluid operated devices. The main frame 30 is generally the same as in FIG. 6, and the same reference numerals are used whenever applicable.

A double acting hydraulic device 40 operating like a pump to cause fluid pressure variations is fitted between the main frame 30 and the rear fork 15. The device is connected to a double acting pressure fluid actuated device 41 by means of conduits 42, 43.

Angular movements at the rear fork 15 will cause fluctuations in the fluid pressure within actuator 40, which will be transferred to the actuated device 41. This is mounted between the top bar of the main frame and a lever 44, similar to lever 32 of FIG. 6, connected to the cross piece 11. Swinging movements of the rear fork 15, will thus adjust the position of the vertical axis 14 in the same way as previously described. By selecting the areas of the pistons working in devices 40 and 41, respectively, a suitable exchange ratio is obtainable.

The embodiment according to FIG. 9 includes the same basic components as FIG. 8, and the same reference numerals are used. A single acting fluid pump device 45 is mounted between the main frame 30 and the rear fork 15. This device is connected to a single-acting actuator 46, connected directly between the main frame 30 and the cross piece by a conduit 47. The pistons within devices 45 and 46 may be spring loaded to assist return movements between power strokes. In the case of device 45 the rear shock absorber 17 will assist in the return movement.

The examples shown must not be regarded as limiting the invention as it is evident to a man skilled in the art, that the individual components may be designed in various ways to make them perform the desired functions.

What I claim is:

1. A motor-cycle having a frame including a main frame member with a front end and a rear end, means at said front end for mounting a steering head supporting a front fork rotatable about a substantially vertical pivot axis, a rear fork swingably supported at the rear end of said main frame member, and spring means at said front and said rear forks, said frame further including horizontal pivot means for carrying said steering head mounting means at the front end of said main frame, and movement transfer means connecting said rear fork with said horizontal pivot means.

2. The motor-cycle frame according to claim 1, in which said steering head supporting means and said horizontal pivot means are formed as an integral cross-piece.

3. The motor-cycle frame according to claim 2, in which said transfer means includes a fork shaped member having tines connected to said rear fork and a shaft connected to said cross-piece, said shaft comprising telescopically displaceable members compressible against the action of resilient means.

4. The motor-cycle frame according to claim 2, in which said transfer means comprises a first forked link connected to said cross-piece and second links connecting each of the tine members of said rear fork with said first link.

5. The motor-cycle frame according to claim 4, in which said first forked link comprises twin means for attachment to said cross-piece, a first of said attachment means being located above said horizontal pivot means and behind said vertical pivot axis, and a second of said attachment means being located below said horizontal pivot means and in front of said vertical pivot axis.

6. The motor-cycle frame according to claim 4, in which the connection between said first forked link and said second links comprises excenter means for varying the distance between the rear end of said first forked link and said rear fork.

7. The motor-cycle frame according to claim 2, in which said transfer means includes fluid pressure actuating means mounted between the main frame member and said rear fork, and pressure fluid actuated means mounted between said main frame and said cross-piece.

8. The motor-cycle frame according to claim 7, in which said pressure fluid actuated means is connected directly to said cross-piece.

9. The motor-cycle frame according to claim 7, in which said pressure fluid actuated means is connected to a lever extending rearwardly from said cross-piece.

* * * * *